United States Patent
Wild et al.

(10) Patent No.: US 8,464,171 B2
(45) Date of Patent: Jun. 11, 2013

(54) DEVICE FOR DISPLAYING A FUNCTION CHART

(75) Inventors: Michael Wild, Henstedt-Ulzburg (DE); Carsten Behling, Himbergen (DE)

(73) Assignee: Eppendorf AG, Hamburg (DE)

( * ) Notice: Subject to any disclaimer, the term of this patent is extended or adjusted under 35 U.S.C. 154(b) by 575 days.

(21) Appl. No.: 12/492,263

(22) Filed: Jun. 26, 2009

(65) Prior Publication Data

US 2010/0333001 A1    Dec. 30, 2010

(51) Int. Cl.
*G06F 3/48* (2006.01)

(52) U.S. Cl.
USPC ........... 715/764; 715/777; 715/780; 715/781; 345/440; 345/660; 455/424

(58) Field of Classification Search
USPC ........................................................ 715/764
See application file for complete search history.

(56) References Cited

U.S. PATENT DOCUMENTS

| | | | | |
|---|---|---|---|---|
| 4,253,152 A | * | 2/1981 | Holdaway | 702/68 |
| 4,801,873 A | * | 1/1989 | Takano | 324/76.12 |
| 5,075,618 A | * | 12/1991 | Katayama | 324/76.27 |
| 5,103,402 A | * | 4/1992 | Morton et al. | 702/76 |
| 5,118,200 A | * | 6/1992 | Kirillov et al. | 374/120 |
| 5,434,954 A | * | 7/1995 | Kawauchi et al. | 345/440 |
| 5,617,523 A | * | 4/1997 | Imazu et al. | 345/440 |
| 5,760,785 A | * | 6/1998 | Barber et al. | 345/440 |
| 6,229,536 B1 | * | 5/2001 | Alexander et al. | 345/440.1 |
| 6,326,986 B1 | * | 12/2001 | Alexander | 715/764 |
| 6,476,829 B1 | * | 11/2002 | Smith et al. | 715/764 |
| 6,847,382 B2 | * | 1/2005 | Chong et al. | 345/660 |
| 6,847,832 B2 | | 1/2005 | Wong et al. | |
| 6,937,237 B2 | * | 8/2005 | McCarthy et al. | 345/440 |
| 7,227,549 B2 | * | 6/2007 | Beasley et al. | 345/440.1 |
| 7,459,898 B1 | * | 12/2008 | Woodings | 324/76.19 |
| 8,006,195 B1 | * | 8/2011 | Woodings et al. | 715/777 |
| 2003/0060864 A1 | * | 3/2003 | Whitebook et al. | 607/105 |
| 2004/0027360 A1 | * | 2/2004 | Loughner, II | 345/660 |
| 2006/0190137 A1 | * | 8/2006 | Free | 700/266 |
| 2007/0088534 A1 | * | 4/2007 | MacArthur et al. | 703/17 |
| 2007/0273694 A1 | * | 11/2007 | Dobyns et al. | 345/440.1 |
| 2009/0118589 A1 | * | 5/2009 | Ueshima et al. | 600/300 |
| 2009/0208921 A1 | * | 8/2009 | Tempst et al. | 435/4 |
| 2010/0030915 A1 | * | 2/2010 | Kiefer et al. | 709/238 |
| 2010/0056128 A1 | * | 3/2010 | Hwang et al. | 455/418 |
| 2010/0153044 A1 | * | 6/2010 | Nara | 702/76 |
| 2010/0286937 A1 | * | 11/2010 | Hedley et al. | 702/60 |

* cited by examiner

*Primary Examiner* — William Bashore
*Assistant Examiner* — Reza Nabi
(74) *Attorney, Agent, or Firm* — Bachman & LaPointe, P.C.

(57) ABSTRACT

A device for the dimensionally variable display of a function chart on a display (10) of a laboratory apparatus, including a processing unit (14) that accesses data storage means (16, 18, 20) for digital laboratory data to be displayed as a function chart, prepares the digital laboratory data for depiction on the display, and can be manually operated via mechanically actuated keys and/or switching means (24), wherein the processing unit for performing the dimensional change of the depicted two-dimensional function chart is designed in such a way that a predetermined dimensional change in the abscissa toward a target range is performed as a reaction to actuating the first key and/or switch (28, 30) and shown on the display in such a way that the target range occupies a predetermined region of the abscissa, and the function chart is displayed along the ordinate in such a way that a predetermined range of ordinates automatically expands the region between a function maximum or a function minimum in the target range, and a reference point in the target range.

18 Claims, 4 Drawing Sheets

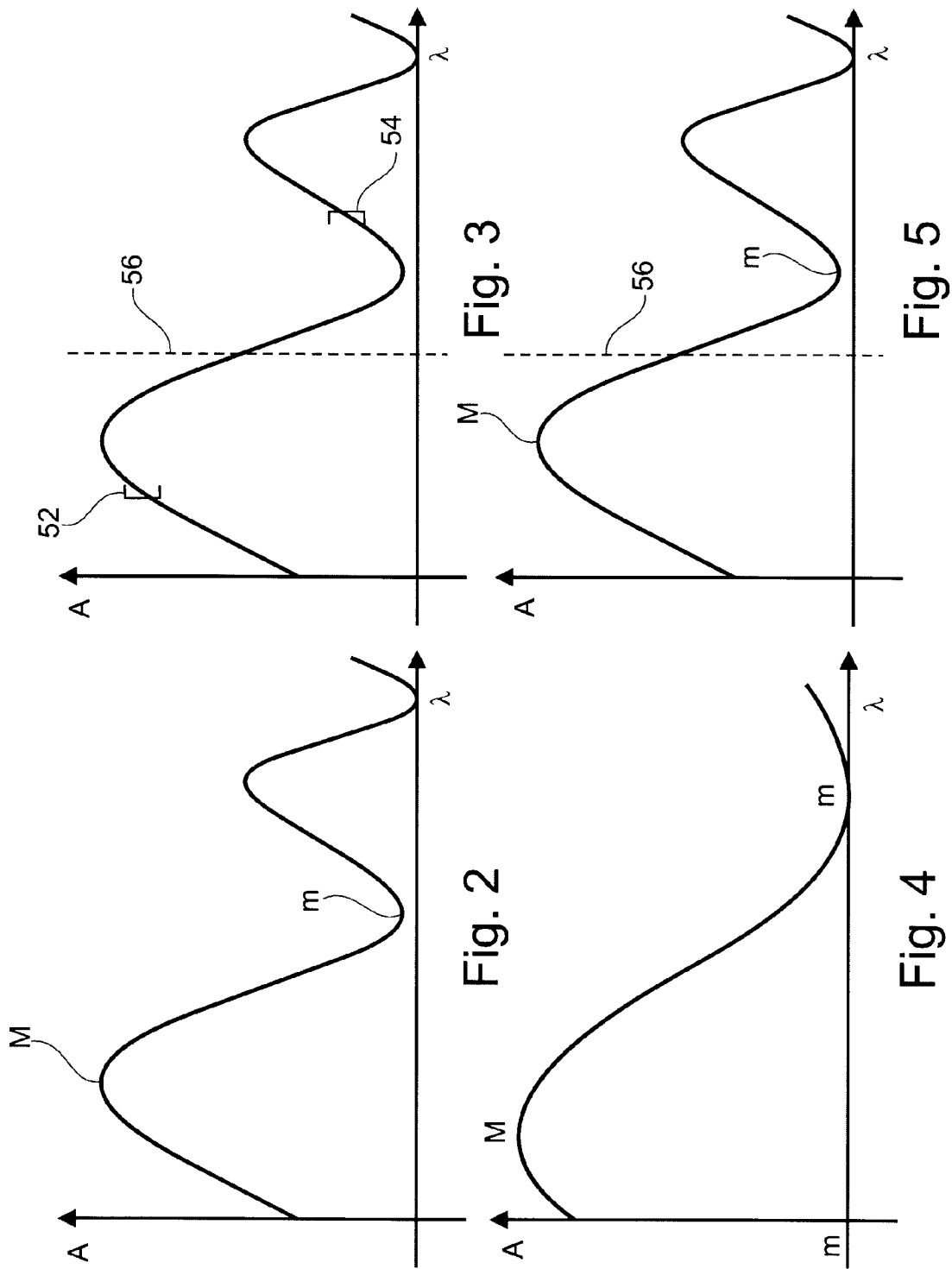

DEVICE FOR DISPLAYING A FUNCTION CHART

BACKGROUND OF THE INVENTION

The present invention relates to a device for the dimensionally variable display of a function chart on the display of a laboratory apparatus.

Such devices are generally known from prior art. For example, U.S. Pat. No. 6,847,382 B2 describes a zoom procedure for a calculator, in which an operator, within a depiction of a function plot on a display, can use a box to be displayed to select a section to be magnified, which is then magnified to a full image on the display.

Within the framework of an application for a digital oscilloscope, U.S. Pat. No. 6,326,986 B1 describes a system and method for graphically manipulating displayed elements, wherein this technology, as in the case of the prior art described above, requires numerous operations or inputs to obtain the desired graphic appearance of the respectively viewed function.

However, precisely in the fields of biological, chemical, or medical analysis technology, where laboratory apparatuses generate a plurality of measured value pairs, which are subsequently to be shown on a display as a function chart, it is absolutely crucial that a device for dimensionally variable display be easy and quick to operate, in particular with respect to the preset magnification or reduction of image sections of the function chart. Not only is it time-consuming, and hence inefficient, for an operator (typically technically trained, working in data analysis) to frequently switch back and forth between various magnification scales of a function chart, wherein this holds true in particular with respect to function curve progressions from a plurality of data pairs (with corresponding increased efficiency potential for the use of the cost-intensive laboratory system). The potential problem that also arises in the laboratory environment is that the extended time required by the operator during analysis to selectively view and magnify a function chart on the display might result in an undesirable impairment or deterioration in a currently assessed sample, as a consequence of which time-critical analytical procedures cannot always be reliably executed.

In addition, biological, chemical, or medical laboratory environments require that a laboratory apparatus and display device be protected to the extent possible against undesired ambient influences like temperature or moisture, while at the same time be as easy for an operator to use (thereby avoiding error).

For this reason, the known approaches to the dimensionally variable representation of a function chart on the display of a laboratory apparatus (laboratory system) is not perfectly suitable for the described intended applications, and even otherwise known zoom technologies for a display device, e.g., realized in touch-sensitive or traditional, pointer-controlled devices (mouse, track pad or trackball) are less adequate for the reasons described. Common usage of gloves in a laboratory environment further complicates usage of such touch-operated technologies (with, e.g., current mobile phone technology not permitting a zoom process enlarging a display range).

SUMMARY OF THE INVENTION

Therefore, the object of the present invention is to improve a known device for the dimensionally variable display of a function chart, in particular for performing a (positive and negative) zoom change in the function chart, with an eye toward making it simple, operator-friendly and safe, as well as suitable in particular for laboratory applications.

The object is achieved by means of a device and method as disclosed herein. Advantageous further developments of the invention are also described herein.

In an advantageous manner according to the invention, the device for implementing the invention is initially realized with a first key and/or switch (typically realized as a mechanically active switch and/or key pair, which can favorably be designed as a membrane key pair, and hence effectively tailored to the laboratory environment), wherein the operator can execute a predetermined dimensional change (in particular zoom) along the abscissa (horizontal axis) by actuating the first key or switch. In this case, the invention encompasses the actuation of the first key or switch to mark a range (preferably denoted by two delimiters) in the direction of the abscissa, which is then magnified over the entire abscissa range (or a suitably specified or to be specified target section), for example as a reaction to another key actuation. As an alternative, the invention provides that the first key or switch be actuated in predetermined (horizontal) magnification or reduction increments to introduce the intended zoom function with a minimum of key actuations.

Parallel to the above, the function chart is automatically adjusted for representation along the ordinate (vertical axis) in such a way that those respective ordinate values of the value pair forming the function chart that correspond to the range (target range) selected along the abscissa are stretched along the ordinate (either over the entire visible or usable ordinate range, or alternatively, over a predetermined or preselected range of ordinates that can also be smaller than the entire visible range of ordinates). According to the invention, this is preferably accomplished by having the processing unit determine a function maximum (i.e., a maximum data pair ordinate value) and a reference point (a second, lower ordinate value, which in particular can also be the zero point or local function minimum in a target range) along the target range, and then adjust the image resolution along the ordinate to the value range between the maximum and reference point.

Implementing this functionality, preferably, the processing unit only accesses those digital laboratory data from the data storage means that fall within the target range for displaying the function chart after the dimensional change.

In a particularly advantageous development according to the present invention, this takes place automatically, so that only the described actuation of the first key or switch, if necessary in conjunction with another key actuation for initiating the dimensional change, enables a regional change in size (zooming) of a displayed function chart with a minimum of operations.

In a particularly suitable manner, the device exhibits a second key and/or switch in a preferred realization of the invention (best mode), which initiates a shift of the function chart along the abscissa when actuated (without a dimensional change taking place along the abscissa). As a result of this favorable functionality, the invention allows a kind of horizontal scrolling process, so that sections of the function can be observed that lie outside the current image display beyond the left or right image boundary. In a particularly suitable and advantageous manner, the automatic dimensional adjustment along the ordinate here makes it possible in this horizontal movement process as well to use the second key or switch (without zooming in a horizontal direction) to both adaptively realize a permanently maximally (or within a prescribed ordinate range) optimized display resolution that always reflects a respective distance between a function maximum and the reference point (function minimum, zero point or another value along the ordinate).

In the simplest realization scenario, it is therefore possible to selectively scroll and zoom through a function chart that extends beyond a current display representation at least at one end by actuating only two keys or switch pairs (specifically a first key or switch pair for realizing the function of the first key in a positive or negative magnification direction, and a second key or switch pair for realizing the second switch or key for horizontal movement in a left or right direction). The only precondition is that the actuation of the first key or switch lead to a zoom behavior with predetermined magnification or reduction steps, wherein the desired horizontal magnification (in conjunction with an automatic ordinate adjustment) is to this extent then initiated around a specifically depicted or imaginary horizontal position (cursor). Conceptually, this then corresponds to a symmetrical (horizontal) zoom range around the horizontal position.

If it makes sense from an operator perspective to achieve certain magnification effects to set or select a (horizontal) zoom range asymmetrically around a horizontal middle position (cursor position), an alternative variant of the invention provides that, in order to realize the first key or switch, a key pair can shift a delimiting marker in an optically visual manner in a horizontal direction on the display to set the target range for the zoom process. Another key or switch operation (for example, using an additional Enter key provided in a further development) would then be used to initiate the image adjustment for changing the dimensions on the display.

In another further development within the framework of the invention, it is provided not just that the function chart can be shown on the display in the dimensionally variable manner described, but rather provided that some other method involving another operation, for example the actuation of a third key or switch described in a further development, be used to initiate a print process by generating suitable printer control data of the (dimensionally changed) display image, with the supplementary or alternative capability of storing a graphic or image file of the display representation in the current dimensionally changed form.

While the present invention is distinguished in the manner described by simplicity and operational safety in conjunction with a high level of display comfort, and to this extent is particularly favorable for the evaluation or analysis of laboratory data as a display function chart, the present invention is not limited to this application. Rather, the approach according to the invention is suitable for any dimensionally variable display representation processes to be controlled in a simple, comfortable manner via key operation, while minimizing the operational and hardware outlay (by optimizing the number of keys and keystrokes necessary).

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2 to FIG. 5 various diagrammatic curves to illustrate the dimensional changes in the function chart that can be realized with the invention;

DETAILED DESCRIPTION

Figure 1:
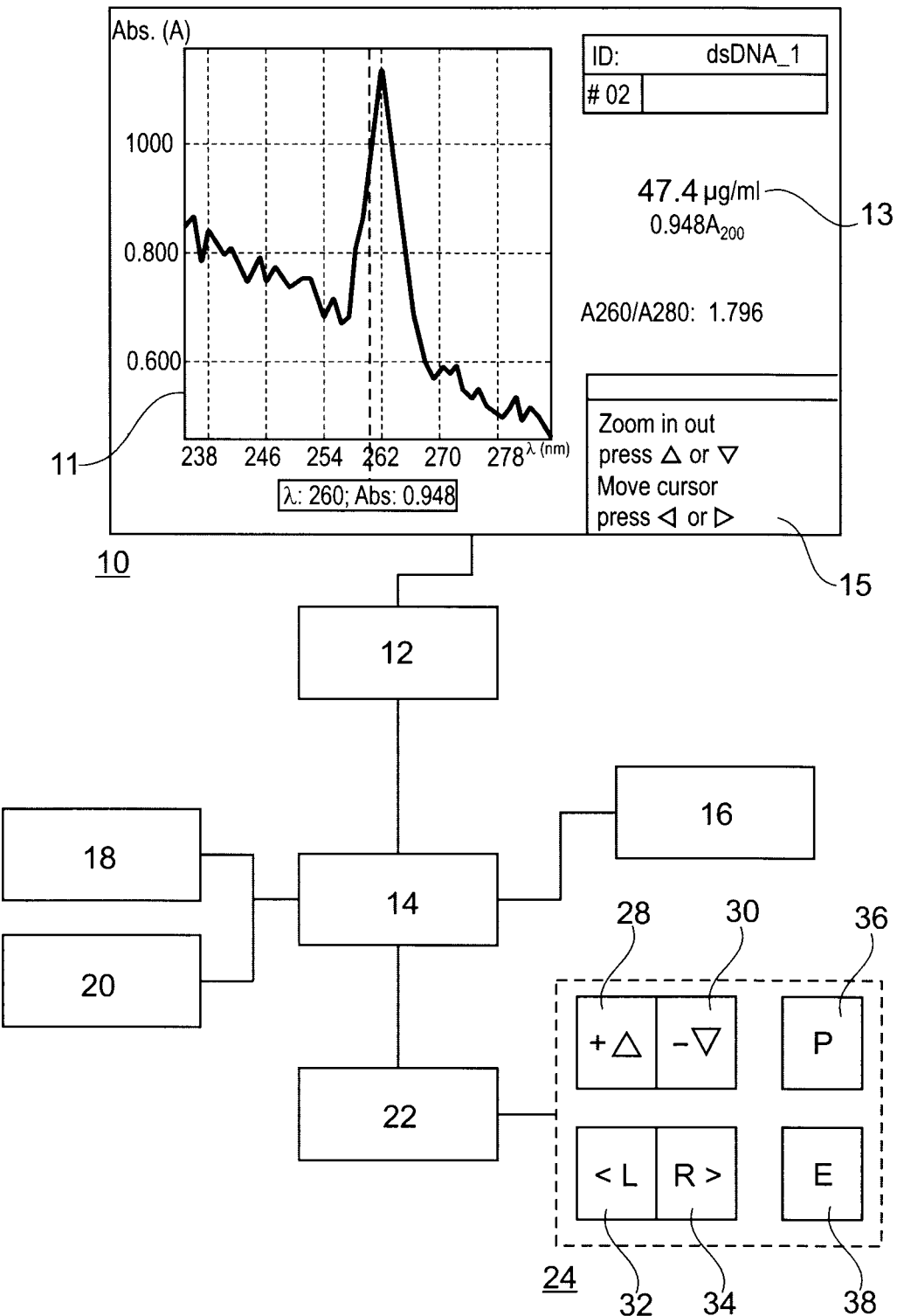
FIG. 1 a diagrammatic block diagram to illustrate essential functional components of the device according to the invention for the dimensionally variable display of a function chart in a first embodiment of the invention.

FIG. 1 illustrates the essential functional components of a device for the dimensionally variable display of a function chart in a first preferred embodiment. The components shown on FIG. 1 are typically accommodated inside a shared device casing, which is used in a laboratory environment for evaluating and analyzing measured laboratory values.

To this end, an image screen unit (display) 10 is provided, which is shaped in the way shown on FIG. 1 by a two-dimensional function display field for depicting a function chart 11, in the present exemplary embodiment of an absorption value A as a function of a wavelength $\lambda$. Also enabled aside from function chart 11 is an optically magnified display of a current measured value or some other parameter (reference number 13), while the display 10 additionally provides an operator with operating instructions in a screen section 15.

An otherwise known image screen driver unit 12 (display driver unit) is used to connect the image screen unit 10 with a central processing unit 14, which, typically realized with a suitably programmed microprocessor or microcontroller unit, prepares measured data for depiction on the display unit 10, e.g., in the manner illustrated on FIG. 1.

The digital measured values acquired by a suitable analysis unit are specifically present for such a display in a data storage unit (DB) 20, and are output from the data storage unit 20 via the central processing unit 14 for preparation and subsequent display in an otherwise known manner. Also allocated to the central processing unit 14 is a permanent storage unit (ROM) 16, which contains permanent or undeletable parameters, operating system routines or similar long-term storage units, for example. Access is also made to a volatile data storage unit (RAM) 18, which can be used, for example, to store a complete record of measured data (more precisely: measured data pairs) based on a respective measurement series, even going beyond a section specifically displayed in the image region 11.

The central processing unit 14 is further connected with an interface unit 22 for manual operation, and has allocated to it a keyboard unit 24 exhibiting several switches or keys. The manual actuation of these switches or keys (diagrammatically depicted as a small keyboard area 24 on the system casing) involves the essential control fields, specifically a first key pair 28, 30, with which an operator can perform a magnification or reduction (positive or negative zooming), along with a second key pair 32, 34, with which the function chart can be scrolled to the right or left (meaning the function chart can be horizontally shifted without any horizontal dimensional change). Also provided is a command key 36 for executing a print command (P), which in an otherwise known manner initiates an interrupt functionality for the central processing unit 14, and thereby enables the generation of print control signals (not to be described in any greater detail) for a printing unit to be connected.

The function progression curves on FIG. 2 to 5 shown in a simplified diagrammatic manner will be used along with the flowchart diagrams on FIGS. 6 and 7 to describe the function and operation of the present invention below.

It is assumed that, in the representation with a first extraction scale, a depiction of the plurality of data pairs takes on the function progression shown on FIG. 2. To this extent, the depiction on FIG. 2 (along with the depiction on the other FIG. 3 to 5) corresponds to the simplified, diagrammatic content of the function chart 11 on FIG. 1

It is further assumed that an operator would prefer to view the function progression between the first curve maximum M on FIG. 2 and the curve minimum m on FIG. 2 in greater detail, and to this extent wishes to zoom (magnify) a curve progression of the image that encompasses both points M and m.

Accordingly, the user shifts a left-side delimiting symbol 52 using key 28 and a right-side delimiting symbol 54 (using key 30) in order to determine the functional range to be subsequently depicted on a magnified scale. This shifting takes place in a horizontal direction, meaning in the direction of the abscissa, and to this extent marks a target range (FIG. 3). Also depicted is a cursor line 56, which, for example when symmetrically adjusting the markings 52, 54, can suitably denote a midpoint or middle axis of a zoom image to be shown on a magnified scale. In particular, this cursor 56 can then also be shifted in a horizontal direction by actuating the keys 32 or 34.

When the acknowledgement key (enter key) 38 is actuated, the system generates the curve progression depicted on FIG. 4 on the screen (or screen section 11). It first becomes evident that the limiting values described by markings 52 or 54 form the end points of the corresponding horizontally magnified function representation on FIG. 6. In addition, the system implemented an automatic vertical magnification, which in the present example is realized in such a way that the maximum distance (deviation) between M and m in a vertical direction now covers the maximum vertical display range. In other words, the (vertical) maximum M remains at its maximum display position in the ordinate direction, while the minimum m was moved to the region of the zero line (here downwardly limiting the vertical display range) by means of vertical spreading. Correspondingly, the view on FIG. 4 shows a magnified section that can be achieved with a reduced number of operations or keystrokes, and hence very rapidly and reliably, now allowing the operator to perform a detailed examination and conduct analyses.

To simplify matters, FIG. 2 to 5 do not depict any axial scaling, which in practical implementation is displayed and dynamically adjusted accordingly.

FIG. 5 shows a further simplified procedure as a variation on the view on FIG. 3. Delimiter markers 52, 54 for determining the target range are not depicted here; rather, the magnification or reduction keys 28, 30 are here directly actuated for horizontal magnification symmetrically to the cursor position 56 (which can still be horizontally shifted via key actuation 32, 34). In a further development, this also makes it possible to eliminate the need for actuating an enter or acknowledgement key 38, since operating the magnification or reduction keys 28, 30 always triggers a horizontal dimensional change of a predetermined increment, which then can lead to the figure progression shown on FIG. 4, similarly to the further automated adjustment of the vertical magnification or spreading.

Figure 6:
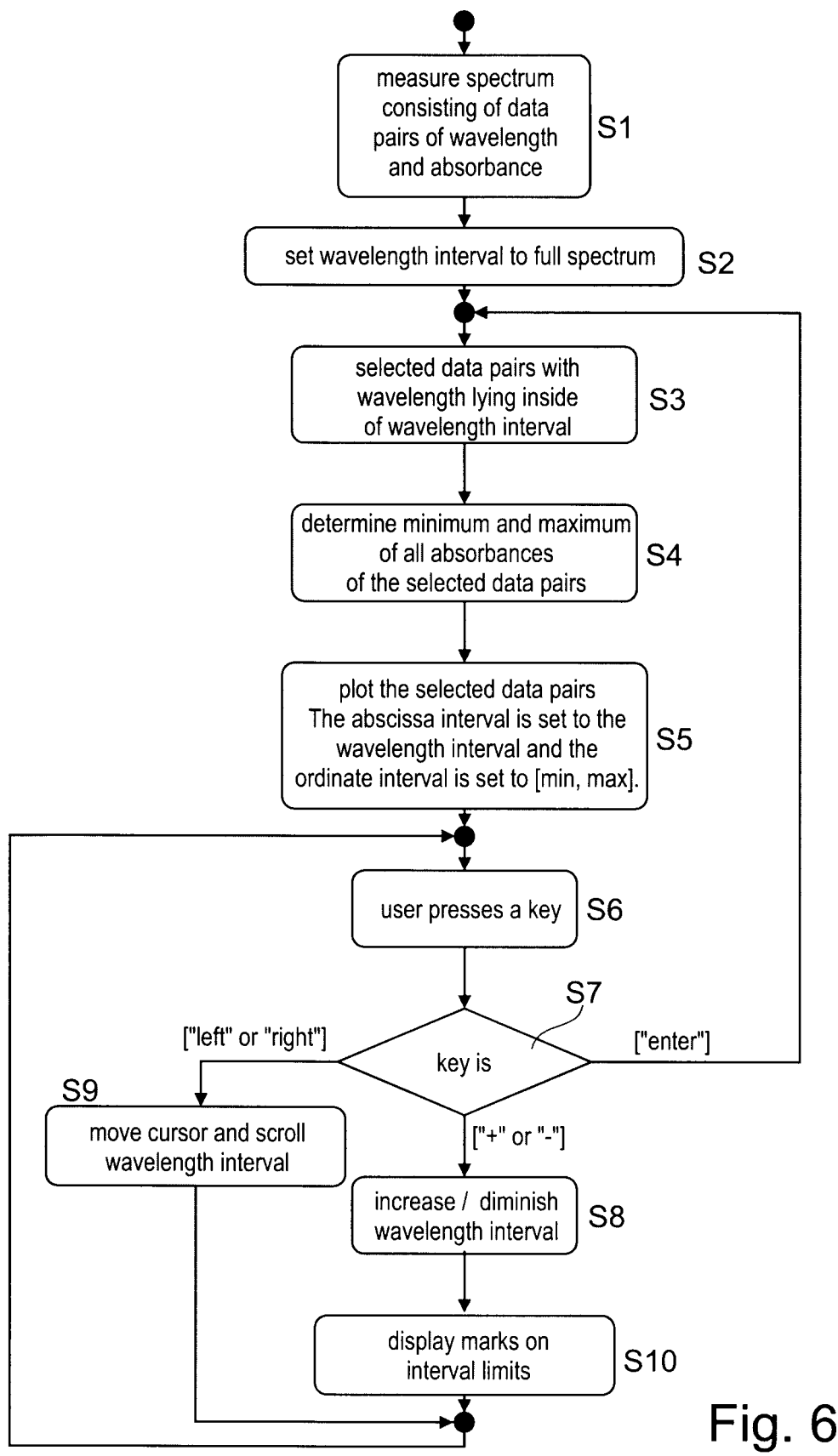
FIG. 6 a flowchart to illustrate the procedural steps according to an embodiment of the invention, which allow the controlled selection of the partial range via the ability to individually shift image markers, and FIG. 7 a flowchart similar to FIG. 6 with another exemplary embodiment to illustrate a simplified procedure that does not require the actuation of an enter or acknowledge key.
Figure 7:
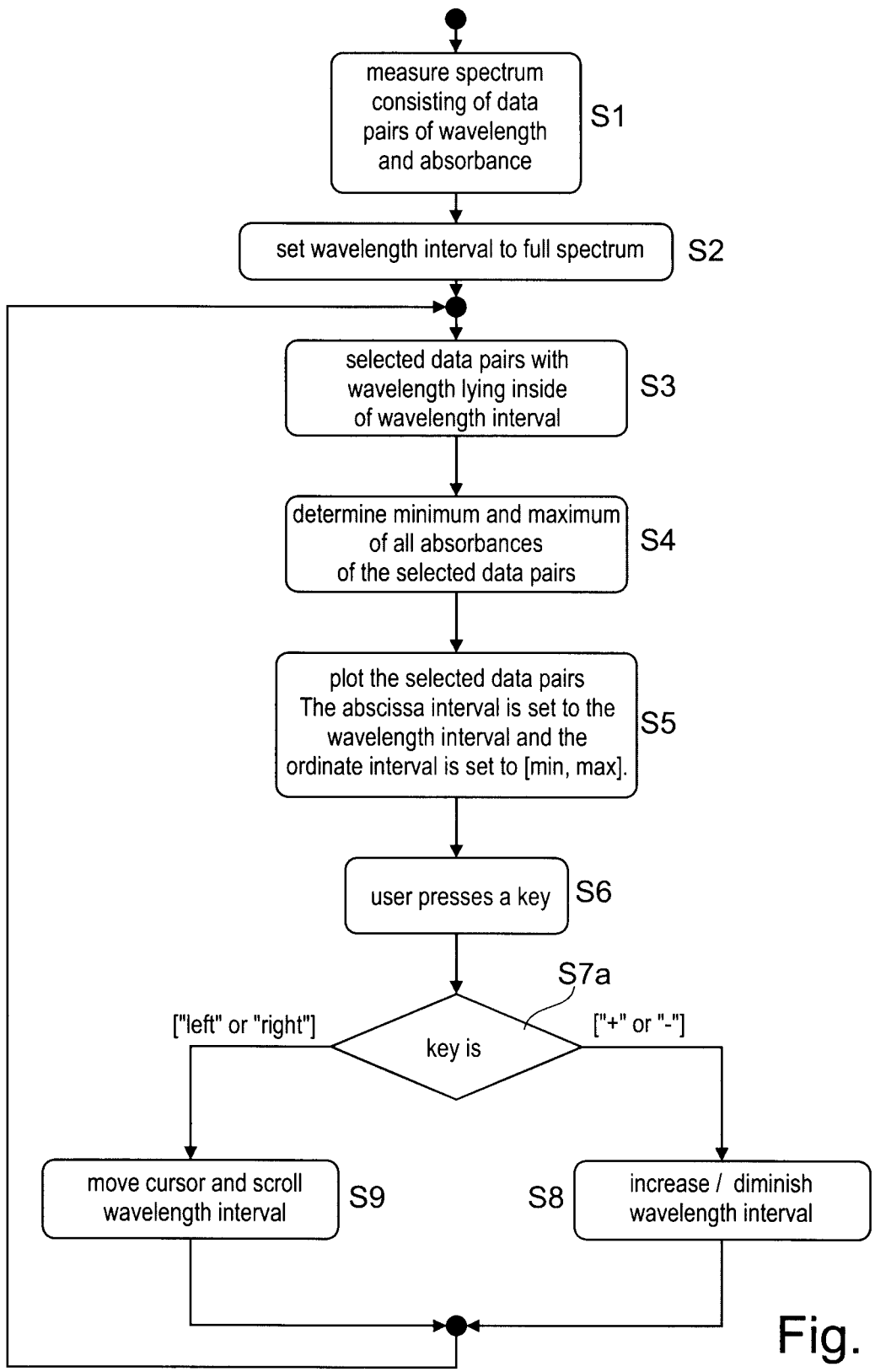

These progressions are summarized in the form of flowchart diagrams based on FIGS. 6 and 7, wherein FIG. 6 depicts the procedure in conjunction with the example on FIG. 3, while the flowchart diagram on FIG. 7 to this extent corresponds to the further simplified embodiment on FIG. 5. Identical or comparable procedural steps are also labeled with the same reference number on FIG. 6 and FIG. 7.

The flowchart diagrams show specifically how the process in the described exemplary embodiments starts with the laboratory system generating spectral data in an otherwise known manner (step S1), which consist of a plurality of data pairs; each data pair describes an absorption (A) as a function of wavelength ($\lambda$). In addition, the wavelength interval is set to "full spectrum" in step S2, so that the full quantity of data pairs is displayed on the image screen area 11 in this first step.

The selection of data pairs from the database DB or of already buffered data from the RAM 18 that lie within the wavelength interval (i.e., with the abscissa area to be displayed as the target range) then takes place in step S3 within a sequential loop.

The accompanying ordinate values are used in step S4 to determine a maximum value (M) and minimum value (m) for all absorption values in the data pairs selected in step S3, and the graphic function display (plot) of the selected data pairs takes place in the ensuing step S5. The dimensional change according to the invention is accomplished by virtue of the fact that the abscissa interval to be depicted is set to the prescribed wavelength interval (target range) on the one hand, and the ordinate interval to be depicted spreads the range between the minimum value m and maximum value M on the other.

Step S6 prompts a key actuation by the operator, wherein the subsequent decision step S7 (for the first exemplary embodiment of the method according to FIG. 6) or decision step S7a (in the second exemplary embodiment of the method according to FIG. 7) determines whether the operator will initiate scrolling, meaning actuate the left or right key (32, 34), whereupon step S9 involves a horizontal scrolling without any change in horizontal dimension, while the target range (wavelength interval) is correspondingly adjusted (magnified, reduced) if the user actuates a magnification/reduction key 28, 30, in the ensuing step S8. The difference between the exemplary embodiments on FIGS. 6 and 7 lies in the fact that, in the first exemplary embodiment, delimiter markings (52, 54 according to FIG. 3) are displayed on the screen, and an acknowledgment key signal ("enter") must be input to initiate the zoom process, while in the second exemplary embodiment on FIG. 7 (as shown on FIG. 5), just actuating the keys 32, 34 or 28, 30 initiates a respective new dimensioning and depiction process on the display.

While embodiments of the present invention have been described above, it should be understood that they have been presented by way of example only, and not limitation.

The invention claimed is:

1. A device for the dimensionally variable display of a function chart on a display (10) of a laboratory apparatus, comprising a processing unit (14) that accesses data storage means (16, 18, 20) for digital laboratory data to be displayed as a function chart, prepares the digital laboratory data for depiction on the display, and can be manually operated via mechanically actuated keys and/or switching means (24), wherein the processing unit for performing the dimensional change of the depicted two-dimensional function chart is designed in such a way that a dimensional change in the abscissa toward a target range is performed as a reaction to actuating the first key and/or switch (28, 30) and shown on the display in such a way that the target range occupies a predetermined region of the abscissa, and the function chart is displayed along the ordinate in such a way that a predetermined range of ordinates automatically expands the region between a function maximum or a function minimum in the target range, and a reference point in the target range, and wherein the processing unit is designed in such a way that the function chart along the ordinate is displayed during actuation of the first and/or a second key or switch via automatic, continuous adjustment of the predetermined region of the ordinate, wherein continuous adjustment of the predetermined region of the ordinate comprises maintaining the maximum at a maximum display position in the ordinate direction while the minimum is moved to the region of the zero line.

2. The device according to claim 1, wherein the predetermined region of the abscissa is a visible useful area of the display (10) or a display representation (11) in the direction of the abscissa.

3. The device according to claim 1, wherein the predetermined region of the ordinate is a visible useful area of the display (10) or a display representation (11) in the direction of the ordinate.

4. The device according to claim 1, wherein the reference point is a function minimum (m), or a function maximum, in the target range, or the zero point.

5. The device according to claim 1, wherein the processing unit is designed in such a way that a shifting of the function chart along the abscissa in the target range is performed as a reaction to the actuation of the second key and/or switch (32, 34), without the dimensional change taking place in the direction of the abscissa.

6. The device according to claim 5, wherein the laboratory apparatus is a spectrometer, and the function chart consists of a plurality of laboratory data that describe an absorption value of a biological, chemical, or medical sample as a function of a wavelength on the ordinate.

7. The device according to claim 1, further comprising means for displaying and/or determining the target range in the function chart before the dimensional change as a pair of delimiting symbols (52, 54), which can be moved by actuating the first key or switch (28, 30).

8. The device according to claim 7, wherein the delimiting symbols are moved symmetrically around a central axis (56) via individual key actuation.

9. The device according to claim 7, wherein the delimiting symbols of the target range are moved separately for each of the delimiting symbols.

10. The device according to claim 1, wherein the first and/or second key or switch is a key pair comprised of spacially associated, or adjacent, manually operable individual keys.

11. The device according to claim 1, wherein the processing unit has allocated to it means (P) for the digital output of the function chart currently shown on the display as a print control signal or print image file, which can be activated by actuating a third key and/or switch.

12. A method for the dimensionally variable depiction of a function chart comprised of a plurality of laboratory data on the display of a biological, medical, or chemical laboratory apparatus, comprising the following steps:

reading out of the digital laboratory data to be represented as a function chart from data storage means;

depicting the laboratory data as a two-dimensional function chart on a display;

acquiring the actuation of a first key and/or switch of the laboratory apparatus;

determining a target range for a dimensional change in the function chart in the abscissa as a reaction to the actuation;

selecting and/or reading out digital laboratory data according to the target range;

determining ordinate values for the dimensionally changed function chart and setting an ordinate range of the function chart from a maximum, or minimum, value and a reference value for the laboratory data in the target range, and depicting digital laboratory data as a dimensionally changed function chart in two-dimensional representation of target range as the abscissa and ordinate region as ordinate on the display and further comprising dynamic adjustment of the ordinate region as a reaction to a continued actuation of the first key or switch, wherein dynamic adjustment of the ordinate region comprises maintaining the maximum at a maximum display position in the ordinate direction while the minimum is moved to the region of the zero line.

13. The method according to claim 12, further comprising shifting of the function chart along the abscissa without any horizontal dimensional change as a reaction to the actuation of a second key and/or switch.

14. The method according to claim 13, further comprising dynamic adjustment of the ordinate region as a reaction to a continued actuation of the second key or switch.

15. The method according to claim 13, further comprising depiction of a position symbol marking a position along the abscissa and a shifting of the position symbol along the direction of the abscissa as a reaction to actuation of the second key or switch.

16. The method according to claim 12, further comprising marking of the target range via the actuation of the first key or switch.

17. The method according to claim 16, wherein the target range is marked by symmetrically moving a pair of target range markings relative to a central position marking along the direction of the abscissa.

18. The method according to claim 16, wherein the target range is marked by individually moving the target range markings along the direction of the abscissa independently of each other.

* * * * *